US012211480B2

(12) United States Patent
Paczkowski et al.

(10) Patent No.: US 12,211,480 B2
(45) Date of Patent: Jan. 28, 2025

(54) SYSTEMS AND METHODS FOR AMBIENT NOISE MITIGATION AS A NETWORK SERVICE

(71) Applicant: T-MOBILE INNOVATIONS LLC, Overland Park, KS (US)

(72) Inventors: Lyle Walter Paczkowski, Mission Hills, KS (US); Galip Murat Karabulut, Vienna, VA (US); Laurent Alexandre Laporte, Spring Hill, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 264 days.

(21) Appl. No.: 18/049,197

(22) Filed: Oct. 24, 2022

(65) Prior Publication Data

US 2024/0135910 A1 Apr. 25, 2024
US 2024/0233700 A9 Jul. 11, 2024

(51) Int. Cl.
*A61F 11/06* (2006.01)
*G10K 11/178* (2006.01)

(52) U.S. Cl.
CPC .. *G10K 11/1781* (2018.01); *G10K 2210/3044* (2013.01)

(58) Field of Classification Search
CPC .................. G10K 11/1781; G10K 2210/3044
USPC ............................................ 381/71.1, 71.5
See application file for complete search history.

(56) References Cited

U.S. PATENT DOCUMENTS 10,295,556 B1 5/2019 Paczkowski et al.

FOREIGN PATENT DOCUMENTS

WO WO-2014126991 A1 * 8/2014 ............ H04S 7/303

* cited by examiner

*Primary Examiner* — Ammar T Hamid
(74) *Attorney, Agent, or Firm* — Shook, Hardy & Bacon L.L.P.

(57) ABSTRACT

Systems and methods for ambient noise mitigation as a network service are provided. In some embodiments, an ambient noise mitigation server establishes at least one low latency network slice for at least one UE coupled to a radio access network. The ambient noise mitigation server generates a cancelation signal based on ambient sound mitigation data received by the radio access network, the ambient sound mitigation data including acoustic sensor data representing an ambient sound signal. The cancelation signal is generated to comprise a phase shift with respect to the ambient sound signal computed at least in part as a function of a location of the at least one UE, and causes at least one acoustic emitter to emit an acoustic cancelation signal based on the cancelation signal. In some embodiments, the phase shift may be adjusted by controlling a latency characteristic of the low latency network slice.

20 Claims, 10 Drawing Sheets

SYSTEMS AND METHODS FOR AMBIENT NOISE MITIGATION AS A NETWORK SERVICE

BACKGROUND

Ambient sounds, also referred to as background noise, often include unwanted sounds that interfere with the ability of a person to accurately hear and process audible information. For example, a user may wish to listen to music, spoken word, or other audible content that is emitted as acoustic signals from headphones, ear pods, or similar accessories. Background noise of sufficient amplitude can superimpose itself on the desired audible signals rendering a combination of sounds that is either unintelligible, or at least unenjoyable, to the user. Noise cancelation techniques, such as active noise cancelation (ANC) and adaptive filtering, represent a form of technology that may be integrated into wearable user equipment such (such as headphones or ear pods) to reduce the effects of background noise while still clearly delivering desired audible content. For example, a set of headphones having noise cancelation functionality may include a speaker to deliver the desired audible content, one or more microphones (for example, to measure ambient noise), and processing logic to generate an anti-noise signal. The anti-noise signal may be mixed with signals carrying the desired audible content in order to cancel background noise from the acoustic signals that reach the user's ear(s). Such noise cancelation techniques substantially increase the complexity of the user equipment (for example, in terms of components needed and local processing resources) as compared to the nominal baseline need of a speaker. Further, the equipment to provide such noise cancelation technologies need to be individually replicated for each user consuming the acoustic content since it is implemented at the user level. Moreover, when the headphone are used in environments where there is little background noise and little need for generating a noise cancelation, the noise cancelation either continues to operate (unnecessarily consuming power resources) or are turned off to become inefficiently utilized idle resources.

SUMMARY

The present disclosure is directed, in part to systems and methods for ambient noise mitigation as a network service, substantially as shown and/or described in connection with at least one of the Figures, and as set forth more completely in the claims.

Systems and methods for ambient noise mitigation as a network service are provided. In contrast to available ambient sound mitigation technologies, embodiments of the present disclosure deliver an ambient sound cancelation signal to user equipment (UE) using an ambient sound mitigation server that may be hosted at the network edge of a telecommunications operator core network. Ambient sound mitigation is provided using a low latency network connection between the UE and the ambient sound mitigation server (e.g., a low latency network slice). In some embodiments the network slice may be established to create an end-to-end logical channel between the UE and the ambient sound mitigation server using a low latency network protocol, such as 5G New Radio (NR) ultra-reliable low latency communications (URLLC). Hosting the ambient sound mitigation server at the network edge may reduce latency and increase reliability, for example by lowering the number of nodes on the data path of the network slice for a UE as compared to the data path through the operator core network.

The ambient sound mitigation server implements a sound wave prediction function to generate the cancelation signal received by the UE. The sound wave prediction function may receive inputs including, for example, a digitized audio signal representing ambient sounds within a venue, a listener position within the venue (e.g., a position of a user's UE), and a venue acoustic profile. Based on these inputs, the sound wave prediction function may predict at least a portion of the ambient sound expected to be received at the location of the UE at a given point in time, and deliver a cancelation signal to cancel that portion of the ambient sound at it is received at the location of the UE at that given point in time. The sound wave prediction function can adjust a phase and/or delay of the cancelation signal in order to adjust the amount of subtractive interference caused by the sum of the cancelation signal with local ambient sound. For example, in some embodiments, the sound wave prediction function may control the latency of the network slice carrying the cancelation signal to adjust the time of arrival of the cancelation signal as received at the UE.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
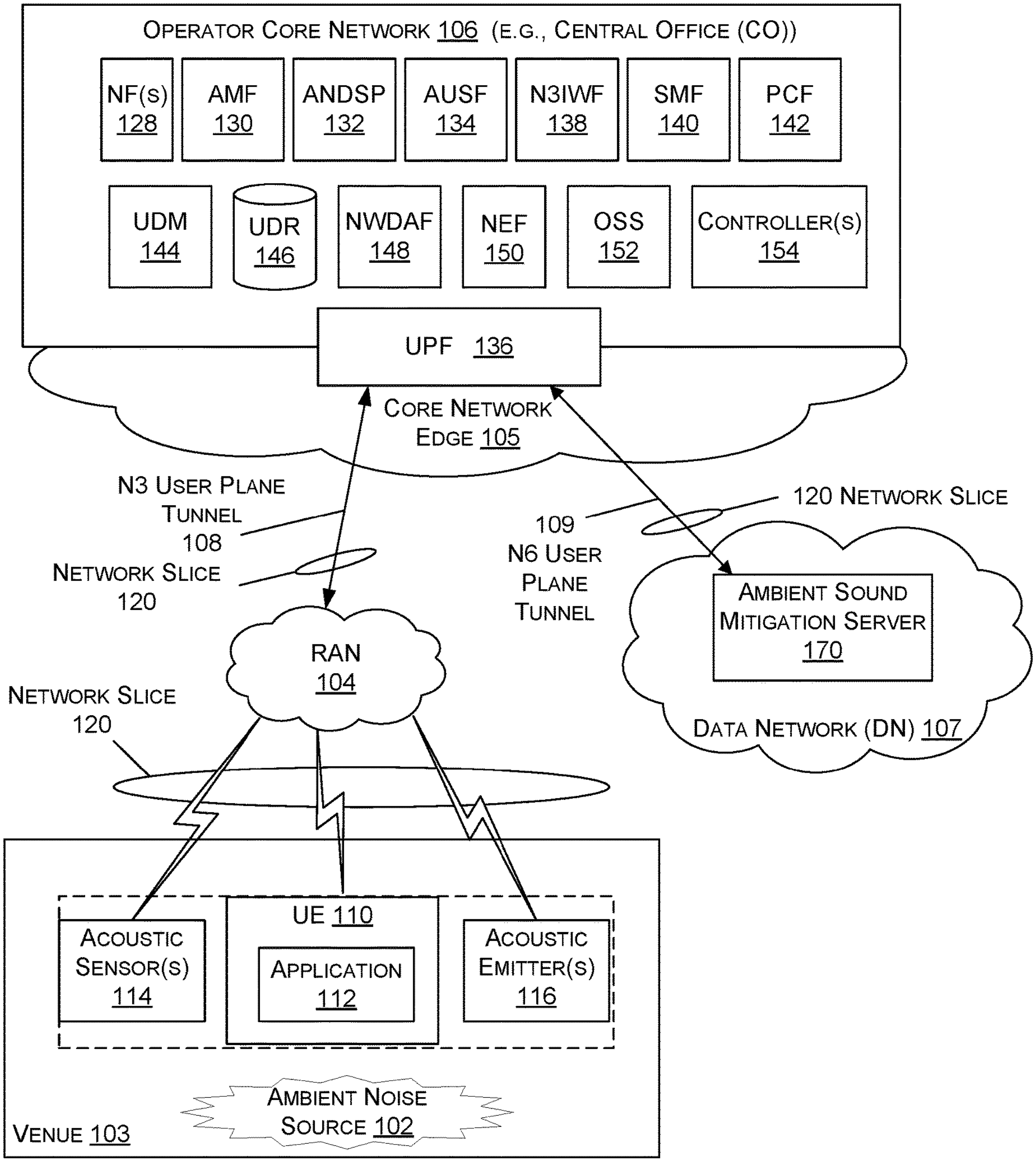
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide for ambient sound mitigation as a network service. Background ambient sounds often interfere with the ability of a person to comprehend and/or enjoy audible content. Background ambient sounds can also represent a source of distraction. However, user devices typically used to deliver audible content typically do not incorporate ambient sound mitigation technologies, and those that do reply on additional supporting sensors and signal processing resources that increase both the complexity and expense of the devices.

In contrast to currently available ambient sound mitigation technologies, embodiments of the present disclosure deliver an ambient sound cancelation signal to user equipment (UE) using an ambient sound mitigation server that may hosted at the network edge of a telecommunications operator core network. Moreover, ambient sound mitigation is provided using a low latency network connection between the UE and the ambient sound mitigation server. For example, in some embodiments a network slice may be established to create an end-to-end logical channel between the UE and the ambient sound mitigation server using a low latency network protocol, such as 5G New Radio (NR) ultra-reliable low latency communications (URLLC), that supports very low end-to-end latencies (e.g., from under 0.5 ms to 50 ms on the application layer and under 1 ms on the 5G radio interface). In some embodiments, individual end-to-end logical channels for a plurality of different UE to the ambient sound mitigation server may be created using URLLC network slicing. Further, hosting the ambient sound mitigation server at the network edge may reduce latency and increase reliability, for example by lowering the number of nodes on the data path of the network slice for a UE as compared to the data path through the operator core network.

In some embodiments, the ambient sound mitigation server implements a sound wave prediction function to generate the cancelation signal received by the UE. The sound wave prediction function may receive inputs including, for example, a digitized audio signal representing ambient sounds within a venue, a listener position within the venue (e.g., a position of a user's UE), and a venue acoustic profile. Based on these inputs, the sound wave prediction function may predict at least a portion of the ambient sound expected to be received at the location of the UE at a given point in time. Using that prediction, the ambient sound mitigation server may deliver a cancelation signal to cancel that portion of the ambient sound at it is received at the location of the UE at that given point in time. Moreover, the sound wave prediction function can adjust a phase and/or delay of the cancelation signal in order to adjust the amount of subtractive interference caused by the sum of the cancelation signal with local ambient sound. For example, in some embodiments, the sound wave prediction function may control the latency of the network slice carrying the cancelation signal to adjust the time of arrival of the cancelation signal as received at the UE.

In some embodiments, the UE receiving the cancelation signal may comprise (and/or be coupled to) a personal device that outputs the cancelation signal as an acoustic signal from personal wearable speakers (such as headphones or ear pods, for example). For example, the UE may include an application that captures ambient sounds in the proximity of the UE using a microphone, and sends a digitized audio signal representing the captured ambient sounds to the ambient sound mitigation server with an indication of the location of the UE. The resulting cancelation signal produced by the ambient sound mitigation server is played as an acoustic signal from the personal wearable speakers to cancel at least a portion of ambient sounds in the proximity of the UE reaching the ears of the user. As explained in greater detail below, the resulting cancelation signal may be computed by the sound wave prediction function of the ambient sound mitigation server at least in part as a function of the location of the UE and a venue acoustic profile. The venue acoustic profile may comprise, for example, an acoustic map of a volume of a space of the venue where the UE is located. The venue acoustic profile may be actively generated using a calibration protocol that sends acoustic calibration signals (e.g., high frequency tones) into the venue and measures resulting return signals. In some embodiments, the venue acoustic profile may account for environmental characteristics that affect the speed of propagation of sound though air, such as temperature and/or humidity. Additionally or alternatively, the venue acoustic profile may be selected from one or more predefined or default profiles. The UE location may be correlated with the venue acoustic profile to determine parameters such as, propagation delays and phase shifts corresponding to the ambient sounds to be canceled and/or multipath characteristics at the UE location (such as reverberations and/or echo effects, for example). In some embodiments, the indication of UE location may be represented as an estimated distance of the UE from a source generating the ambient sounds to be canceled.

In other embodiments, the ambient sound mitigation server may be used for an open space ambient sound mitigation implementation. That is, the UE may receive from the ambient sound mitigation server a cancelation signal for broadcast as an acoustic signal from a speaker into an area proximate to the UE. In some embodiments, the speaker may be integral to the UE, or coupled to the UE (e.g., via a wired or wireless connection). For example, the UE may include an application that captures ambient sounds in the proximity of the UE using a microphone, and sends a digitized audio signal representing the captured ambient sounds to the ambient sound mitigation server with an indication of the location of the UE. The resulting cancelation signal received in return from the ambient sound mitigation server is broadcast into the area where the UE is located and cancels at least a portion of ambient sounds in the proximity of the speaker from reaching the ears of one or more users in that area.

Advantageously, embodiments presented herein provide technical solutions representing advancements over existing noise cancelation techniques. More specifically, one or more of the embodiments described herein provide ambient noise mitigation functionality to devices that do not themselves have integrated noise cancelation capabilities. For example, a standard smart phone and connected earbuds that do not have active noise cancelation can subscribe to ambient noise mitigation as a service (on an as-needed basis) from the phone's wireless connectivity provider. Advances in ambient noise mitigation algorithms and/or network latency control may be implemented at the ambient sound mitigation server (or other network node) so that the benefits of such advances can be realized without the need to replace hardware at the UE level. Moreover, by providing ambient noise mitigation as a network service from the ambient noise mitigation server, subscriber scaling may be realized without a corresponding need to increase computing resources at the UE level. That is, additional subscribers may be served by the ambient sound mitigation server as long as low latency bandwidth is available at the edge network. Further, the solutions provided by locating the ambient sound mitigation server at the core network edge facilitate low latency communications while reduce network congestion and consumption of processing resource within the network operating core itself. Consumers benefit by using the services of the ambient sound mitigation server without the need to substantially upgrade their UE.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

It should be understood that the UE discussed herein are in general forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, or any other smart device that at least in part operated based on service data received via a network. That said, in some embodiments, UE may also include handheld personal computing devices such as cellular phones, tablets, and similar consumer equipment, or stationary desktop computing devices, workstations, servers and/or network infrastructure equipment. As such, the UE may include both mobile UE and stationary UE configured to request ambient noise mitigation service from a network.

FIG. 1 is a diagram illustrating an example network environment 100 for implementing network based ambient sound mitigation in accordance with some embodiments of this disclosure. Network environment 100 is but one example of a suitable network environment and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises an operator core network 106 (also referred to as a "Core Network") that provides one or more network services to one or more user equipment (UE) 110 via a radio access network 104. In some embodiments, network environment 100 may comprise a wireless communications network. In some embodiments, the RAN 104 comprises a radio access network (RAN), often referred to as a cellular base station. The RAN 104 may be referred to as a gNodeB in the context of a 5G New Radio (NR) implementation, or other terminology depending on the specific implementation technology. In some embodiments, the RAN 104 may comprise in part components of a customer premises network, such as a distributed antenna system (DAS) for example. In some embodiments, the RAN 104 may comprise a non-terrestrial base station, such as a base station implemented by an Earth orbiting satellite.

In particular, each UE 110 communicates with the operator core network 106 via the RAN 104 over one or both of uplink (UL) radio frequency (RF) signals and downlink (DL) radio frequency (RF) signals. The RAN 104 may be coupled to the operator core network 106 via a core network edge 105 that comprises wired and/or wireless network connections that may themselves include wireless relays and/or repeaters. In some embodiments, the RAN 104 is coupled to the operator core network 106 and/or network edge 105 at least in part by a backhaul network such as the Internet or other public or private network infrastructure. The network edge 105 comprises one or more network nodes or other elements of the operator core network 106 that define the boundary of the operator core network 106, including user plane functions 136 (as further discussed herein). In some embodiments, the network edge 105 may serve as the architectural demarcation point where the operator core network 106 connects to other networks such as, but not limited to RAN 104, the Internet, or other third-party networks.

As shown in FIG. 1, network environment 100 may also comprise at least one data network (DN) 107 coupled to the operator core network 106 via the network edge 105. Data network 107 includes an ambient sound mitigation server 170, which may provide ambient sound mitigation services to the UE 110 as further discussed herein. The ambient sound mitigation server 170 may be implemented as a component of, or coupled to, the core network edge 105. In some embodiments, the ambient sound mitigation server 170 may be integrated at least in part within the RAN 104. In some embodiments, the functions and services provided by the ambient sound mitigation server 170 may be implemented by one or more processors executing instructions that cause the processor to perform those functions of the ambient sound mitigation server 170 (and subcomponents thereof) as described herein.

As further shown in FIG. 1, the UE 110 may be located in a venue 103 within which ambient sound mitigation services are provided. The term "venue" is intended be construed broadly as any place, location, scene, etc., where ambient sound mitigation services are desired. As such, example venues may include, but are not limited to, a theater, auditorium, amphitheater, music hall, gymnasium, a stadium, a studio, a campus or facility commons, a garden, a room or other area of a residence or hotel, an office, and/or any other enclosed or non-enclosed space where ambient sound mitigation may be desired. Also located within venue 103, in this example embodiment, may be one or more acoustic sensors 114 and one or more cancelation emitters (also referred to herein as acoustic emitters) 116. The acoustic sensor 114 may include, for example, a microphone used to capture ambient sound signals observable from within the venue 103, for example as produced by an ambient sound (e.g., noise) source 102. The captured ambient sound signals may be transmitted (e.g., by UE 110) as digitized audio signal samples to the ambient sound mitigation server 170 as ambient sound mitigation data. The acoustic emitter 116 may include, for example, a speaker used to emit an acoustic cancelation signal and/or calibration signals into the venue 103. In some embodiments, the acoustic sensor 114 and/or the acoustic emitter 116 may be integrated components of the UE 110, or accessories connected to the UE 110. For example, the acoustic sensor 114 may be implemented using built-in microphone of the UE 110, or via a microphone of an accessory coupled to the UE 110 (such as a microphone of a headset or ear pods connected to the UE 110 by a wired or wireless connection). Similarly, the acoustic emitter 116 may be implemented using built-in speaker of the UE 110, or via a speaker of an accessory coupled to the UE 110 (such as a speaker and/or an earpiece of a headset or ear pods connected to the UE 110 by a wired or wireless connection). In other embodiments, an acoustic sensor 114 and/or acoustic emitter 116 may comprise a distinct device or devices. For example, in some embodiments an acoustic sensor 114 and/or acoustic emitter 116 may be comprised within a smart speaker or similar smart appliance that comprises its own processor to execute software that sends digitized audio signal representing the captured ambient sounds to the ambient sound mitigation server 170 and/or receives an cancelation signal from the ambient sound mitigation server 170.

In embodiments, ambient sound mitigation data, such as the digitized audio signal representing the captured ambient sounds and/or the location of the UE, may be transmitted from the venue 103 (e.g., by UE 110) and transported to the ambient sound mitigation server 170 via the RAN 104 through a low latency network slice (e.g. using 5G NR URLLC) as illustrated at 120. In turn, the ambient sound mitigation server 170 computes a cancelation signal based on the ambient sound mitigation data and a venue acoustic profile. The cancelation signal is transported back through the low latency network slice 120 for acoustic emission by the acoustic emitter 116. In some embodiments, when UE 110 subscribes to the ambient sound mitigation service, the ambient sound mitigation server 170 may generate a profile to use the low latency network slice 120.

It should be understood that in some aspects, the operating environment 100 may not comprise a distinct operator core network 106, but rather may implement one or more features of the operator core network 106 within other portions of the network, or may not implement them at all, depending on various carrier preferences. The operating environment 100, in some embodiments, may be configured for wirelessly connecting UE 110 to other UE 110 or other telecommunication networks, or a publicly-switched telecommunication network (PSTN). Generally, each UE 110 is a device capable of unidirectional or bidirectional communication with RAN 104 using radio frequency (RF) waves. The operating environment 100 may be generally configured, in some embodiments, for wirelessly connecting UE 110 to data or services that may be accessible on one or more application servers or other functions, nodes, or servers (such as services from ambient sound mitigation server 170 or other servers of data network 107).

Still referring to FIG. 1, in some implementations, the operator core network 106 may comprise modules, also referred to as network functions (NFs), generally represented in FIG. 1 as NF(s) 128. Such network functions may include, but are not limited to, one or more of a core access and mobility management function (AMF) 130, an access network discovery and selection policy (ANDSP) 132, an authentication server function (AUSF) 134, a user plane function (UPF) 136, non-3GPP Interworking Function (N3IWF) 138, a session management function (SMF) 140, a policy control function (PCF) 142, unified data management (UDM) 144, an unified data repository (UDR) 146, Network Data Analytics Function (NWDAF) 148, a network exposure function (NEF) 150, and an operations support system (OSS) 152. Implementation of these NFs of the operator core network 106 may be executed by one or more controllers 154 on which these network functions are orchestrated or otherwise configured to execute utilizing processors and memory of the one or more controllers 154. The NFs may be implemented as physical and/or virtual network functions.

Notably, nomenclature used herein is used with respect to the 3GPP 5G architecture. In other aspects, one or more of the network functions of the operator core network 106 may take different forms, including consolidated or distributed forms that perform the same general operations. For example, the AMF 130 in the 3GPP 5G architecture is configured for various functions relating to security and access management and authorization, including registration management, connection management, paging, and mobility management; in other forms, such as a 4G architecture, the AMF 130 of FIG. 1 may take the form of a mobility management entity (MME). The operator core network 106 may be generally said to authorize rights to and facilitate access to an application server/service such as provided by application function(s) requested by any of the UE 110.

As shown in FIG. 1, UPF 136 represents at least one function of the operator core network 106 that extends into the core network edge 105. In some embodiments, the RAN 105 is coupled to the UPF 136 within the core network edge 105 by a communication link that includes an N3 user plane tunnel 108. For example, the N3 user plane tunnel 108 may connect a cell site router of the RAN 104 to an N3 interface of the UPF 136. In some embodiments, the ambient sound mitigation server 170 may be coupled to the UPF 136 in the core network edge 105 by a N6 user plane tunnel 10. For example, the N6 user plane tunnel 109 may connect a network interface (e.g. a switch, router and/or gateway) of the DN 107 to an N6 interface of the UPF 136.

The AMF 130 facilitates mobility management, registration management, and connection management for 3GPP devices such as a UE 110. ANDSP 132 facilitates mobility management, registration management, and connection management for non-3GPP devices. AUSF 134 receives authentication requests from the AMF 130 and interacts with UDM 144, for example, for SIM authentication. N3IWF 138 provides a secure gateway for non-3GPP network access, which may be used for providing connections for UE 110 access to the operator core network 106 over a non-3GPP access network. SMF module 140 facilitates initial creation of protocol data unit (PDU) sessions using session establishment procedures. The PCF 142 maintains and applies policy control decisions and subscription information. Additionally, in some aspects, the PCF 142 maintains quality of service (QoS) policy rules. For example, the QoS rules stored in a unified data repository 146 can identify a set of access permissions, resource allocations, or any other QoS policy established by an operator. In some embodiments, the PCF 142 maintains subscription information indicating one or more services and/or micro-services subscribed to by each UE 110. Such subscription information may include subscription information pertaining to a subscription for ambient sound mitigation services provided by the ambient sound mitigation server 170. UDM 144 manages network user data including, but not limited to, data storage management, subscription management, policy control, and core network 106 exposure. NWDAF 148 collects data (for example, from UE, other network functions, application functions and operations, administration, and maintenance (OAM) systems) that can be used for network data analytics.

The OSS 152 is responsible for the management and orchestration of the operator core network 106, and the various physical and virtual network functions, controllers, compute nodes, and other elements that implement the operator core network 106.

Some aspects of operating environment 100 include the UDR 146 storing information relating to access control and service and/or micro-service subscriptions, for example subscription information pertaining to a subscription for ambient sound mitigation services provided by the ambient sound mitigation server 170. The UDR 146 may be configured to store information relating to such subscriber information and may be accessible by multiple different NFs in order to perform desirable functions. For example, the UDR 146 may be accessed by the AMF 130 in order to determine subscriber information pertaining the ambient sound mitigation server 170, accessed by a PCF 142 to obtain policy related data, accessed by NEF 150 to obtain data that is permitted for exposure to third party applications (such as an application 112 executed by UE 110, for example). Other functions of the NEF 150 include monitoring of UE related events and posting information about those events for use by external entities, and providing an interface for provisioning UEs (via PCF 142) and reporting provisioning events to the UDR 146. Although depicted as a unified data management module, UDR 146 can be implemented as a plurality of network function (NF) specific data management modules.

The UPF 136 is generally configured to facilitate user plane operation relating to packet routing and forwarding, interconnection to a data network (e.g., DN 107), policy enforcement, and data buffering, among other operations. As discussed in greater detail herein, in accordance with one or more of embodiments, the UPF 136 may implement URLLC protocols to provide an extremely low latency network slice (e.g., a communication path) between the UE 110, acoustic sensor 114 and/or acoustic emitter 116 located in venue 103, and the ambient sound mitigation server 170. Using network slicing (e.g., using 5G software-defined networking (SDN) and/or 5G network slice selection function (NSSF)), the UPF 136 may establish a dedicated URLLC network slice that operates, in essence, as a distinct network (for example, establishing its own QoS, provisioning, and/or security) within the same physical network architecture of the core network edge 105 that may be used to establish other network slices. Using the URLLC protocols, the RAN 104 may reserve network capacity for uplink and/or downlink communications between the UE 110 and the ambient sound mitigation server 170 without the latency that otherwise might be introduced from sending scheduling requests and waiting for access grants, thus reducing the latency involved in sending uplink ambient sound mitigation data to the ambient sound mitigation server 170 and/or providing in the downlink, the cancelation signal for output by the acoustic emitter 116. In embodiments where one or more portions of the operating environment 100 are not structured according to the 3GPP 5G architecture, the UPF 136 may take other forms to establish an extremely low latency network slice that are equivalent in function to the URLLC network slice described herein.

Figure 2A:
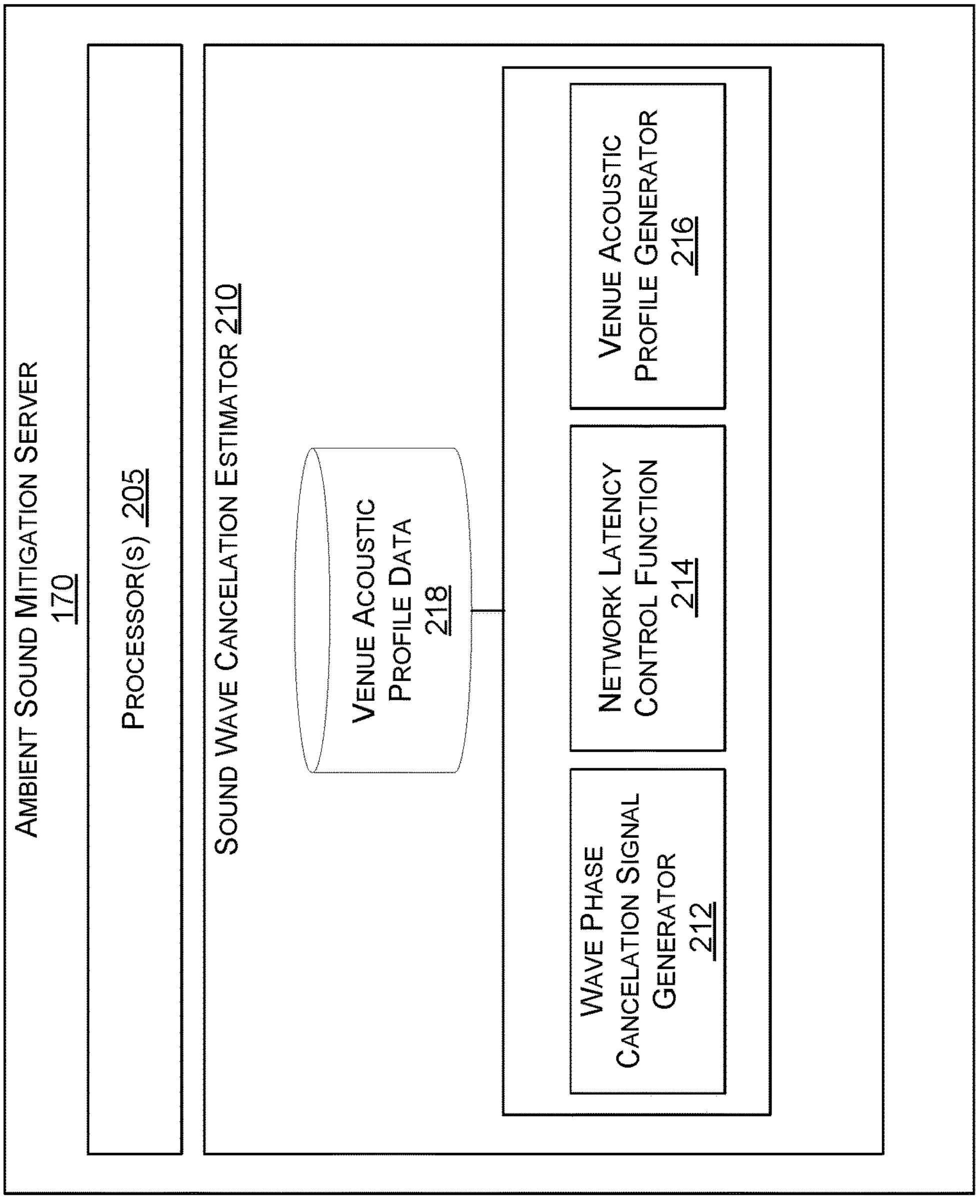
FIG. 2A is a diagram illustrating an example ambient sound mitigation server, in accordance with some embodiments described herein.
Figure 7:
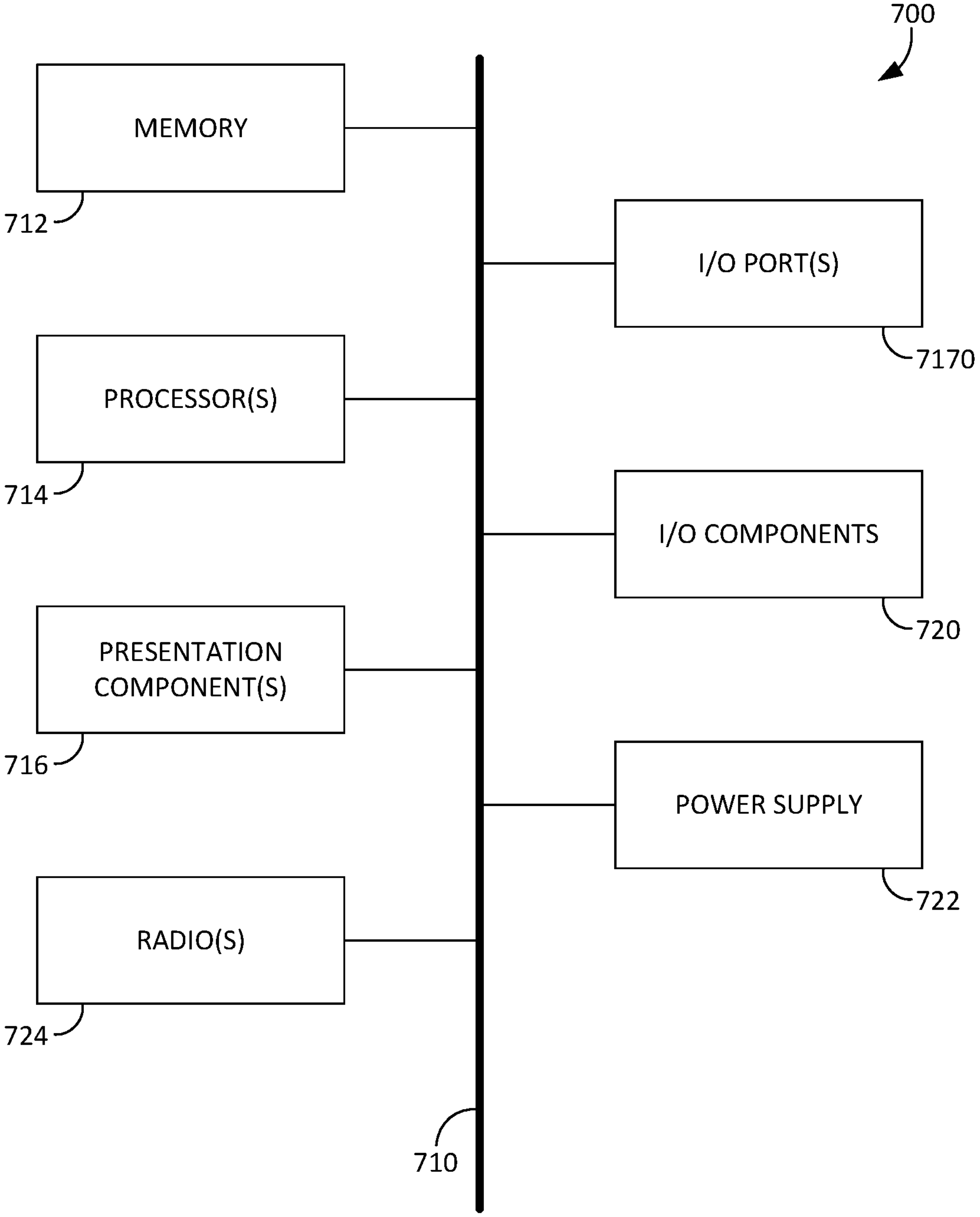
FIG. 7 is diagram illustrating an example computing environment according to an embodiment.
Figure 8:
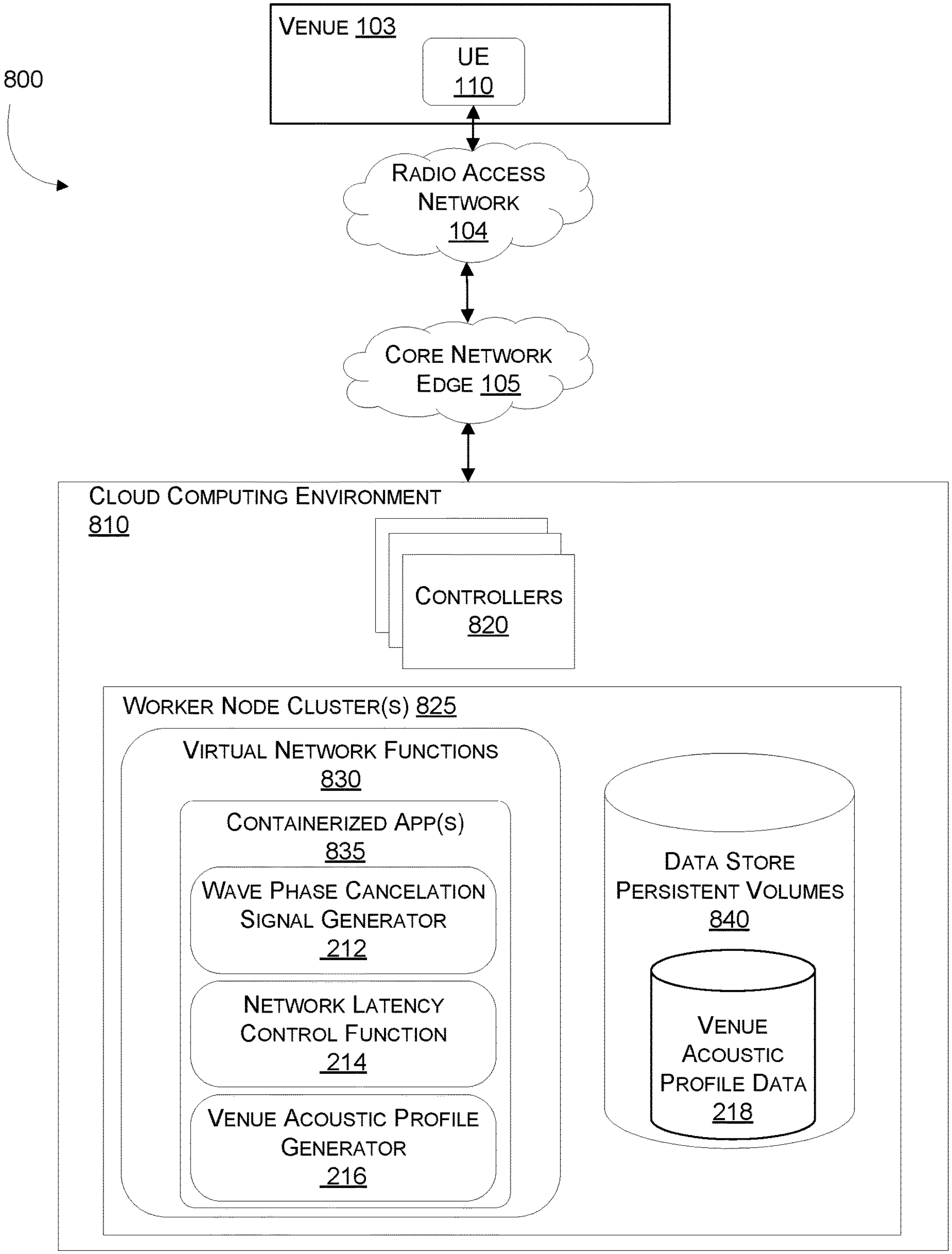
FIG. 8 is diagram illustrating an example cloud-computing environment according to an embodiment.

FIG. 2A is a block diagram illustrating an example ambient sound mitigation server 170, such as shown in FIG. 1. The ambient sound mitigation server 170 may include one or more processors 205 programed using executable code to implement the functions of the ambient sound mitigation server 170 described herein. In some embodiments, the ambient sound mitigation server 170 may be implemented using a computing device 700 as shown in FIG. 7 and/or cloud computing environment 810 as shown in FIG. 8. As shown in FIG. 2, the ambient sound mitigation server 170 may include a sound wave cancelation estimator 210 (which may be executed, for example, using the one or more processors 205). As shown in FIG. 2A, the sound wave cancelation estimator 210 may include one or more of a wave cancelation signal generator 212, a network slice latency control function 214, a venue acoustic profile generator 216 and venue acoustic profile data 218.

Figure 2B:
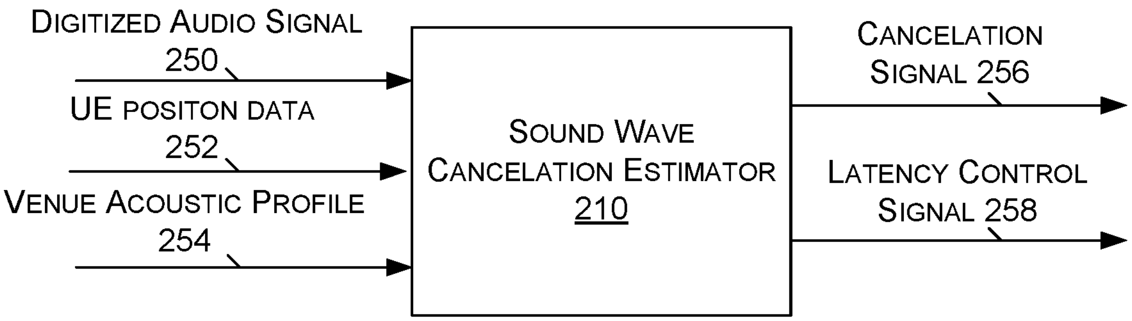
FIG. 2B is a diagram illustrating an example sound wave cancelation estimator, in accordance with some embodiments described herein.

As previously discussed and now illustrated FIG. 2B, the sound wave cancelation estimator 210 may receive inputs that include a digitized audio signal representing ambient sounds within the venue (shown at 250), UE position data 252 (e.g., a position of a user's UE 110), and a venue acoustic profile 254. Based on these inputs, the sound wave cancelation estimator 210 may predict at least a portion of ambient sound expected to be received at the location of the UE 110 at a given point in time, and generate a cancelation signal 256 for output as an audio signal from the acoustic emitter 116. For example, the sound wave cancelation estimator 210 may compute a prediction of the next time slice (e.g., 1-10 milliseconds) of ambient sound expected to be received at the location of the UE 110. The cancelation signal 256 may be computed based at least in part as an inverse of the digitized audio signal 250 in order to cancel at least a portion of ambient sound received at the location of the UE 110 at the given point in time. In some embodiments, the sound wave cancelation estimator 210 may adjust a phase of the cancelation signal 256 in order to adjust the subtractive interference caused by the summing of the audio signal output of the acoustic emitter 116 from the cancelation signal 256 with the local ambient sound at the UE 110. In some embodiments, the sound wave cancelation estimator 210 may output a latency control signal 258 to control the latency of the network slice transporting the cancelation signal 256 and adjust the time of arrival of the cancelation signal 256 as received at the UE 110. For example, in some embodiments, may modify a 5G Quality of Service (QoS) identifier (which may be referred to as a 5QI code), which in turn may increase or decrease the latency of the network slice supporting the ambient mitigation services for UE 110.

Returning to FIG. 2A, in some embodiments, the cancelation signal 256 is generated by the wave cancelation signal generator 212. The wave cancelation signal generator 212 inputs the digitized audio signal 250, UE position data 252, and may determine the venue acoustic profile 254 from previously determined venue acoustic profile data 218, and using that information generates the cancelation signal 256. For example, based on the digitized audio signal 250 representing captured ambient sounds from the venue 103 the wave cancelation signal generator 212 may compute a prediction of one or more ambient sounds expected to be received at the UE 110, and compute the cancelation signal 256 based at least in part as a function of the inverse of the prediction one or more ambient sounds. In some embodiments, the wave cancelation signal generator 212 may analyze the digitized audio signal 250 to identify repeating patterns or spectral characteristics of components within the digitized audio signal 250 that represent noise signals (or other audio content defined as unwanted content) that may be selected for cancelation using the cancelation signal 256. For example, in some embodiments, wave cancelation signal generator 212 may execute a machine-learning model or other logic trained and/or programed to identify ambient noise components from the digitized audio signal 250. In some embodiments, wave cancelation signal generator 212 may subdivide the digitized audio signal into multiple bands (e.g., frequency bands) and individually process the multiple bands as described herein to generate individual respective sub-components of the cancelation signal 256. For example, sub-component cancelation signals generated in this manner may be multiplex together to form the cancelation signal 256. In some embodiments, the wave cancelation signal generator 212 may selectively adjust the cancelation signal 256 (e.g., based on a control signal from a UE 110) by selectively generating a sub-component cancelation signal for one or more of the multiple bands, while not generating a sub-component cancelation signal for one or more other bands of the multiple bands. In this way, the cancelation signal 256 can be tailored to mitigate ambient sounds based on their frequency/spectrum characteristics.

Because ambient sounds travel as a propagating wave, the phase of the ambient sound at any instance in time will vary both as a function of time and as a function of distance between the UE 110 and the source of the ambient sound. Moreover, the amplitude of the ambient sound will attenuate as a function of that distance. Accordingly, the wave cancelation signal generator 212 may further use the UE position data 252 to determine an estimate of the distance between the source of the ambient sound and the UE 110 and control the transmission timing of the cancelation signal 256 (and/or the network slice latency) such that the acoustic cancelation signal emitted by the acoustic emitter 116 will be out of phase with the ambient sound (ideally by 180 degrees) then arriving at the UE 110. The amplitude of the acoustic cancelation signal emitted by the acoustic emitter 116 may be controlled by the sound wave cancelation estimator 210 to approximately match that of the ambient sound then arriving at the UE 110, given an estimated attenuation of the ambient sound due to the distance traveled.

Figure 3:
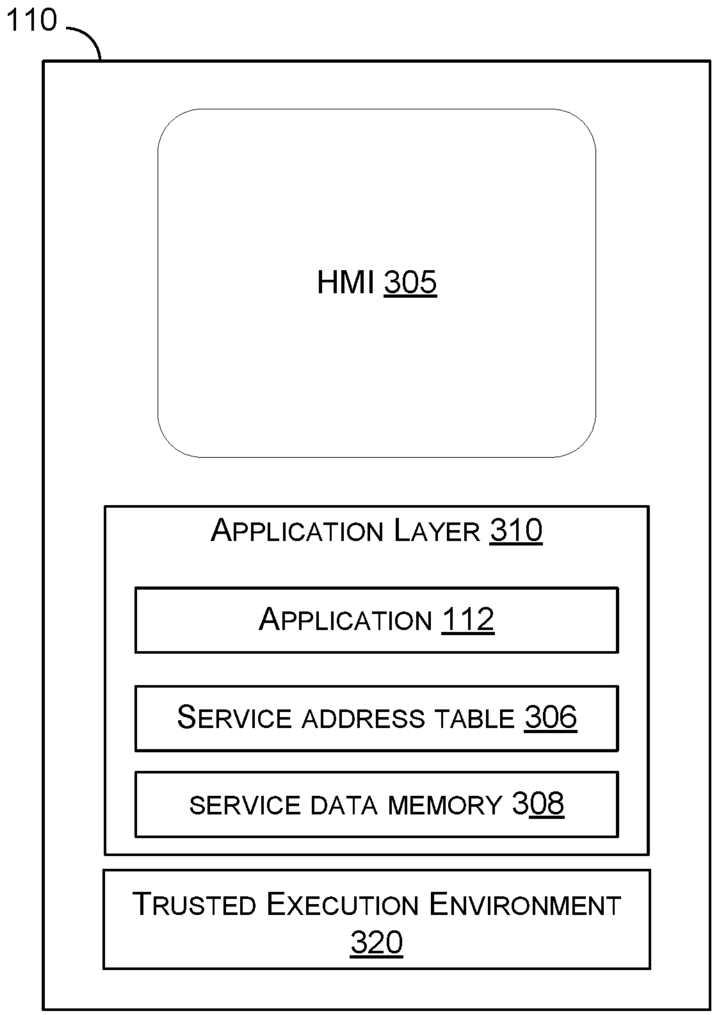
FIG. 3 is a diagram illustrating example user equipment, in accordance with some embodiments described herein.

In different implementations, the UE position data 252 used by the wave cancelation signal generator 212 may be based on different types of data to represent the location of the UE 110. For example, the UE 110 may comprise an active positioning technology, such as a global navigation satellite system receiver (e.g., such as a global positioning system (GPS) receiver), ultra-wide band (UWB) localization receiver, or other positioning technology, and transmit UE position data 252 based on coordinates determined using such technologies. In some embodiments, the UE 110 may comprise a range finding technology, such as a laser or ultrasonic range finder, that may be used to determine a distance from the UE 110 to the ambient sound source, and include that distance as the UE position data 252. In some embodiments, the UE position data 252 may comprise distance based on user entered data. For example, the application 112 of the UE 110 may display a user interface (such as shown in FIG. 3 discussed below) to receive one or more control inputs from a user of the UE 110. For example, the user interface may include a control element (e.g., such as a slider or control dial) that the user interacts with to control an estimate of distance included in the UE position data 252. In one such embodiment, the user may adjust the control element while listening and evaluating the quality of ambient sound cancelation until they find a control element setting that provides optimal ambient sound cancelation in their judgment. The value corresponding to that control element setting can then be included in the UE position data 252 and used by the wave cancelation signal generator 212 to account for distance.

In some embodiments, the wave cancelation signal generator 212 may control the network latency control function 214 in order to generate the latency control signal 258. For example, the wave cancelation signal generator 212 may indicate a specific a timing delay of the network slice supporting the ambient mitigation services for UE 110 that will result in the cancelation signal 256 arriving out of phase with ambient sounds within a target threshold. The network latency control function 214 may correlate that timing delay to network parameters (such as a 5QI code, for example) corresponding to that timing delay and generate a latency control signal 258 (e.g., in the format of a message or control command) that will cause the RAN 104 and/or other component of the UPF 136 to adjust the network slice 120 to provide the specified timing delay.

Figure 2C:
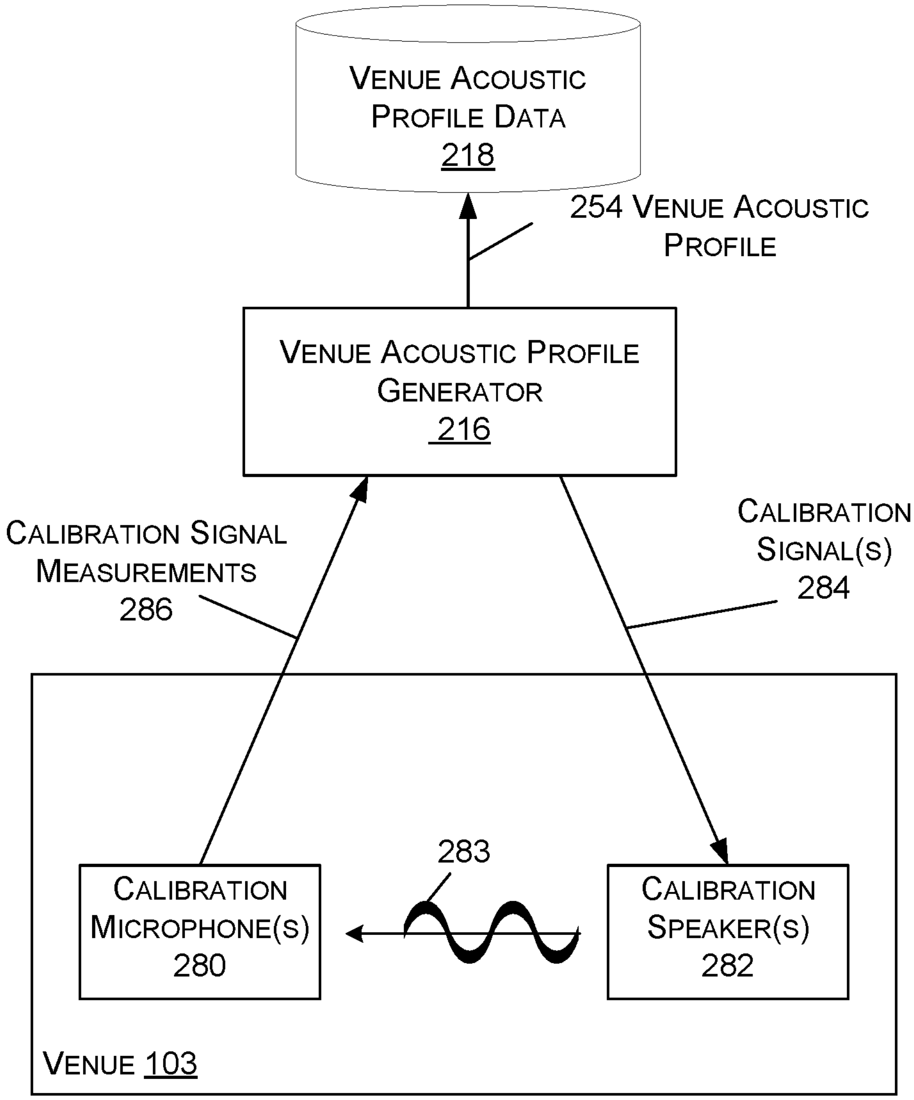
FIG. 2C is a diagram illustrating an example acoustic calibration protocol, in accordance with some embodiments described herein.

The venue acoustic profile 254 may be used by the wave cancelation signal generator 212 to account for characteristics of the venue's structure and/or environment. For example, the speed of propagation of ambient sound in the venue 103 may be affected by factors such as the temperature and/or humidity of the environment. Accordingly, the venue acoustic profile 254 may include propagation data that can be used to estimate the speed of sound in the venue, and adjust the timing of the cancelation signal 256 such that the acoustic cancelation signal emitted by the acoustic emitter 116 will be out of phase with the ambient sound (ideally by 180 degrees) within a phase threshold then arriving at the UE 110. In some embodiments, the venue acoustic profile 254 may comprise such data derived from measurements of sound propagation delays. For example, as shown in FIG. 2C, in some embodiments, the network environment 100 shown in FIG. 1 may further include one or more calibration microphones 280 located within the venue 103, and one or more calibration speakers 282 located within the venue 103. The one or more calibration microphones 280 may include the acoustic sensor 114. The one or more calibration speakers 282 may include the acoustic emitter 114. In some embodiments, the venue acoustic profile generator 216 may perform a calibration protocol that includes sending one or more calibration signals 284 comprising one or more test tones 283 (e.g., a spectrum of test tones) to the calibration speaker(s) 282 for broadcast into the venue 103. The calibration signal(s) 284 are received by the calibration microphone(s) 280 and measurements of the calibration signals 286 returned to the venue acoustic profile generator 216. Based on one or more metrics derived using the returned measurements of the calibration signals 286 (e.g., propagation delays and/or relative phase shifts and a function of frequency), the venue acoustic profile generator 216 may compute an estimate of the speed of sound in the venue and store that estimate as the propagation data in the venue acoustic profile 254 stored for the venue 103 in the venue acoustic profile data 218. In some embodiments, the venue acoustic profile generator 216 may re-execute this calibration protocol periodically (e.g., once per minute) to refresh the propagation data to account for changes in the environmental conditions at the venue 103 over time.

The venue acoustic profile 254 may be used by the wave cancelation signal generator 212 to further account for characteristics of the venue's structure that produce multipath characteristics in the ambient sounds such as reverberations and/or echo effects, for example. For example, in some embodiments, the venue acoustic profile generator 216 may execute the calibration protocol discussed above to generate an acoustic map of a volume of the venue 103. For example, the measurements of the calibration signals 286 returned to the venue acoustic profile generator 216 may be evaluated for phase shifts and/or multipath signal summations incurred by the calibration signal(s) 284 due to interactions with surfaces of structural elements such as floors, walls, pillars, ceilings, and other surfaces. The results may be represented by the acoustic map and stored in the venue acoustic profile 254 for the venue 103 in the venue acoustic profile data 218. In other embodiments, the venue acoustic profile 254 may include an acoustic map based on one or more predefined and/or default profiles. For example, the venue acoustic profile 254 may include a predefined generic "small room" acoustic map parameters accounting for structural surfaces in close proximity. Another venue acoustic profile 254 may include a predefined generic "open space" acoustic map parameters accounting for a venue with few, or no, structural surfaces.

In some embodiments, wave cancelation signal generator 212 may execute a machine learning model or other logic trained and/or programed to input the venue acoustic profile 254, UE position data 252, and digitized audio signal 250 and predict at least a portion of the ambient sound expected to be received at the location of the UE 110 at a given point in time. Using that prediction, the wave cancelation signal generator 212 may generate the cancelation signal 256 to cancel that portion of the ambient sound at it is received at the location of the UE 110 at that given point in time.

In some embodiments, one or more aspects of the ambient sound mitigation service provided by the ambient sound mitigation server 170 may be controlled via an application 112 executed by the UE 110. For example, the wave cancelation signal generator 212 may receive a control from the application 112 of the UE 110 indicating a frequency band, noise characteristic or similar identification representative of the portion of the ambient sound that the wave cancelation signal generator 212 may target for cancelation. For example, the application 112 may provide a user interface on the UE 110 from which a user may select a baseline noise profile to target for cancelations (e.g., such as corresponding to white, pink, blue, and black noise colors as defined by American National Standard T1.523-2001, Telecom Glossary 2000).

FIG. 3 is an illustration of an example UE 110, that executes an application 112 that includes instructions for subscribing to ambient sound mitigation service via the ambient sound mitigation server 170 such as described with respect to any of the embodiments presented herein. In some embodiments, the UE 110 may comprise a computing device such as computing device 700 discussed below with respect to FIG. 7. Although some UE's may include other systems, generally, UE 110 includes at least a human machine interface (HMI) 305, and an application layer 310, and may further include a trusted execution environment 320. In some embodiments, one or more user interfaces (UIs) generated by the application 112 as discussed herein may be displayed on the HMI 305. Control elements for receiving one or more control inputs from a user of the UE 110, as discussed herein, may be provided via the HMI 305.

The application layer 310 facilitates execution of the UE 110 operating system and executables (including applications such as application 112) by one or more processors or controllers of the UE 110. The application layer 310 may provide a direct user interaction environment for the UE 110 and/or a platform for implementing mission specific processes relevant to the operation of the UE 110. TEE 320 facilitates a secure area of the processor(s) of UE 110. That is, TEE 320 provides an environment in the UE 110 where isolated execution and confidentiality features are enforced. Example TEEs include Arm TrustZone technology, Software Guard Extensions (SGX) technology, or similar.

As shown in FIG. 3, the application layer 310 further includes at least one service address table 306 and service data memory 308 that may be implemented as one or more software stacks in the application layer 310. When the application 112 generates a service and/or micro-service request for ambient noise mitigation service, the request may be generated to include an address obtained from the service address table 306 for the ambient sound mitigation server 170. The ambient noise mitigation service request is then routed to the ambient sound mitigation server 170 based on that address. Data returned in response to the ambient noise mitigation request may be saved to the service data memory 308, where it is directly accessible to the application 112.

Figure 4A:
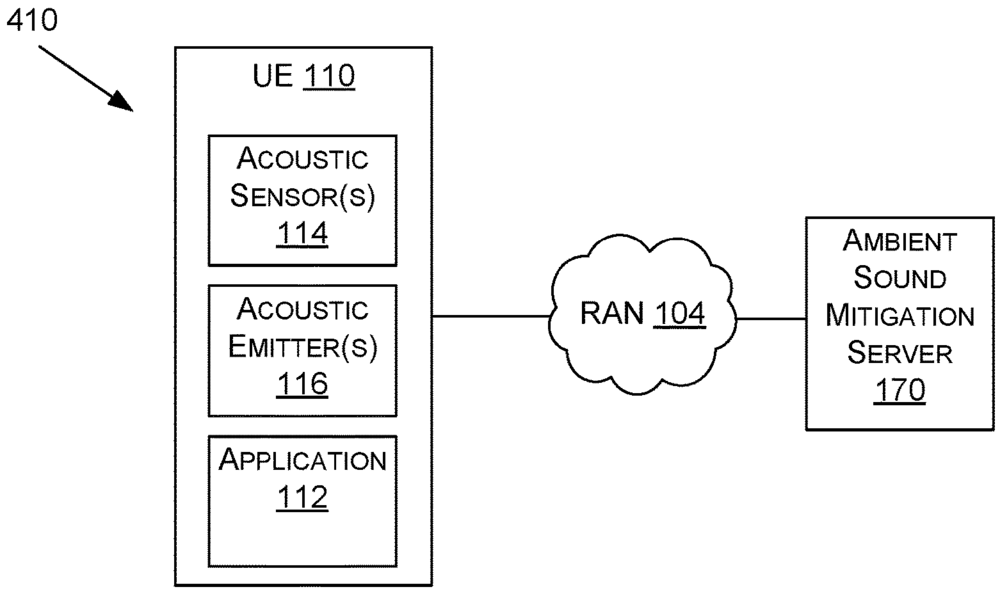
FIGS. 4A and 4B are diagrams illustrating example ambient sound mitigation service configurations, in accordance with some embodiments described herein.
Figure 4B:
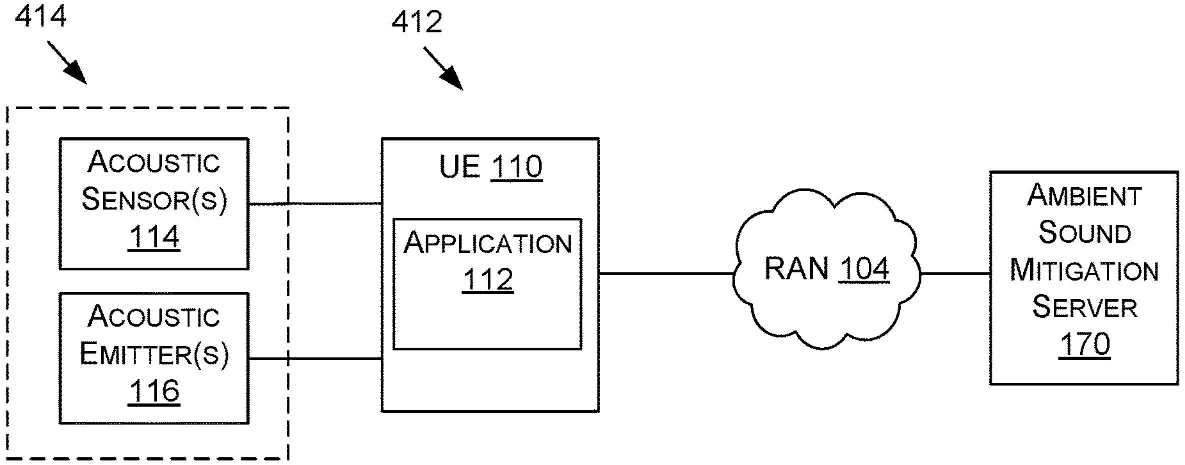

FIGS. 4A and 4B illustrate example, non-limiting, configurations for ambient sound mitigation service implementations. For example, FIGS. 4A and 4B may illustrate embodiments where ambient sound mitigation service is provided by a cancelation signal 256 that is broadcast generally into the venue 103. FIG. 4A illustrates what may be referred to as an embodiment where the UE 110 is implemented as a smart appliance 410. In this embodiment, the smart appliance 410 may take the form-factor of, for example, a bookshelf appliance, a floor appliance and/or a tabletop appliance, that integrally comprises the acoustic sensor(s) 114 and/or acoustic emitter(s) 116. The application 112 may be implemented as an embedded component of the smart appliance 410, and may directly subscribe to the ambient sound mitigation service from ambient sound mitigation server 170 as described herein. In some embodiments, the smart appliance 410 may further include applications to provide one or more other services, such as subscribing to a music streaming service (e.g. via the RAN 104 or other network interface) and may play a received music stream via the acoustic emitter 116, or provide for voice/digital assistance services (e.g., such as, but not limited to, Apple Siri and/or Amazon Alexa) using the acoustic sensor(s) 114 and acoustic emitter(s) 116, and a network connection (e.g. via the RAN 104 or other network interface). In other embodiments, such as shown in FIG. 4B, the acoustic sensor(s) 114 and/or acoustic emitter(s) 116 may be distinct audio components from a smart appliance 412 (or other UE 110) that executes the application 112. For example, the acoustic sensor(s) 114 and/or acoustic emitter (s) 116 may be components of a traditional (e.g., non-IoT) audio system 414 that exchanges audio signals with the smart appliance 412 (e.g., analog or digital wired connections and/or wireless connections). The smart application 412, in turn, subscribe to the ambient sound mitigation service from ambient sound mitigation server 170 as described herein and provides the audio mitigation service in conjunction with the audio system 414. In either embodiment, because the underlying audio mitigation technology is implemented as a network based service, improvements to the audio mitigation provided by these systems can be realized by upgrading the soundwave cancelation estimator 210 at the ambient sound mitigation servicer 170, potentially avoiding the need to update hardware at the subscriber level.

Figure 5:
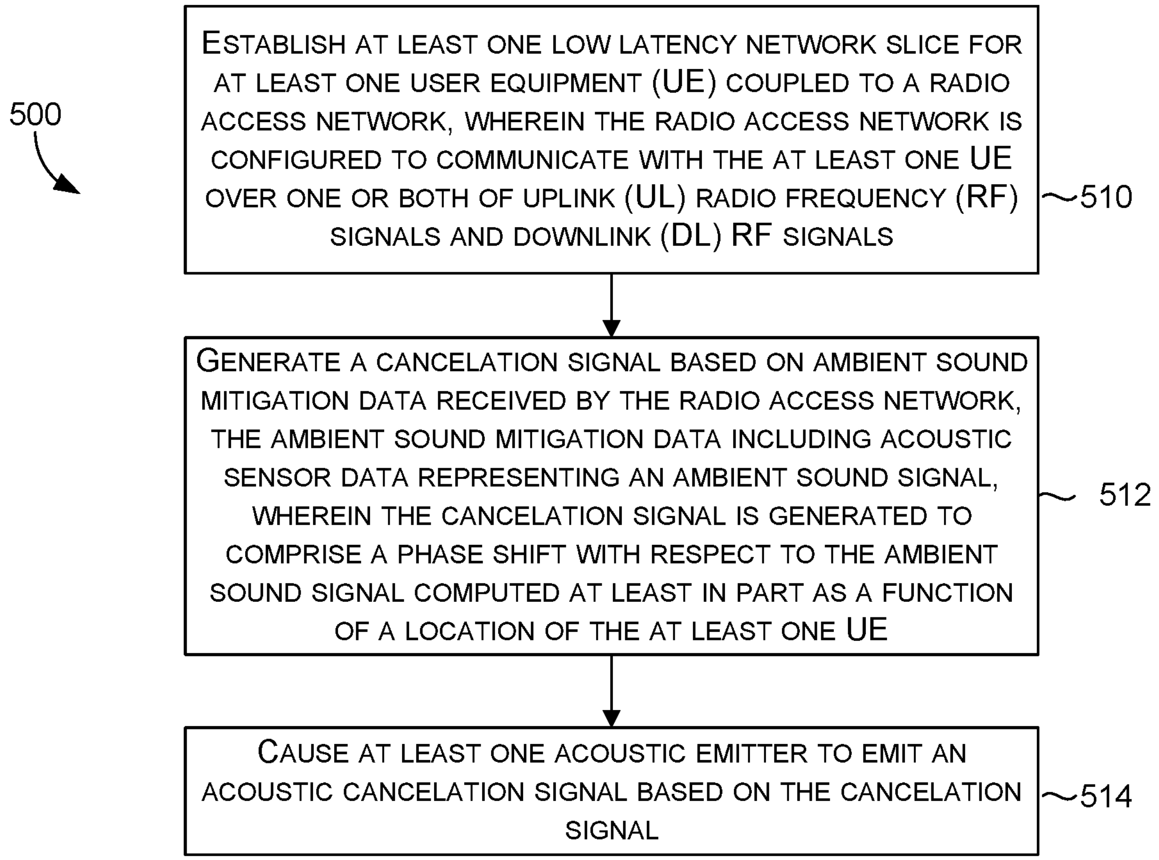
FIG. 5 is a flow chart illustrating an example method for network based ambient sound mitigation, in accordance with some embodiments described herein.

FIG. 5 is a flow chart illustrating a method 500 for providing ambient sound mitigation network services, according to one embodiment. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figured and/or embodiments described herein and vice versa. In some embodiments, elements of method 500 are implemented utilizing UE 110, ambient sound mitigation servicer 170 and/or other components of the network environment 100 as disclosed above. For example, one or more non-transient computer-readable media may store computer-usable instructions that, when executed by the one or more processors, cause the one or more processors to perform the method.

The method 500 at 510 includes establishing at least one low latency network slice for at least one user equipment (UE) coupled to a radio access network, wherein the radio access network is configured to communicate with the at least one UE over one or both of uplink (UL) radio frequency (RF) signals and downlink (DL) RF signals. In some embodiments, the radio access network comprises a 5G New Radio (NR) base station. As previously discussed, the radio access network may be coupled to a network operator core (e.g., an operator core network of a telecommunications network comprising at least one radio access network). In such embodiments, the radio access network communicates uplink (UL) and downlink (DL) signals between one or more UE within a coverage area radio access network and the network operator core. The at least one low latency network slice may comprise an ultra-reliable low latency communications (URLLC) network slice. The low latency network slice may be used to couple the UE(s) to an ambient sound mitigation server hosted at the network edge of the telecommunications operator core network. Ambient sound mitigation may be provided using the low latency network connection between the UE and the ambient sound mitigation server.

The method 500 at 512 includes generating a cancelation signal based on ambient sound mitigation data received by the radio access network, the ambient sound mitigation data including acoustic sensor data representing an ambient sound signal, wherein the cancelation signal is generated to comprise a phase shift with respect to the ambient sound signal computed at least in part as a function of a location of the at least one UE. The location of the at least one UE may at least in part indicate a distance between the at least one UE and a source producing the ambient sound signal. Moreover, the phase shift may be dynamically adjusted at least in part by controlling a latency characteristic of the at least one low latency network slice. In some embodiments, the cancelation signal may be further based on a venue acoustic profile for a venue in which the at least one UE is located. For example, the method may include estimating a change in a speed of sound due to changes in environmental characteristics and adjust the phase shift at least in part based on the change in a speed of sound. In some embodiments, the method may include generating a venue acoustic profile for a venue in which the at least one UE is located based on broadcasting a calibration signal into the venue, and generating the cancelation signal further based on the venue acoustic profile. The venue acoustic profile may comprise an acoustic map of the venue.

The method 500 at 514 includes causing at least one acoustic emitter to emit an acoustic cancelation signal based on the cancelation signal. In some embodiments, the cancelation signal may be transmitted as an acoustic signal from personal wearable speakers (such as headphones or ear pods, for example). The resulting cancelation signal produced by the ambient sound mitigation server is played as an acoustic signal from the personal wearable speakers to cancel at least a portion of ambient sounds in the proximity of the UE reaching the ears of the user. In some embodiments, cancelation signal may be broadcast as an acoustic signal from one or more speakers into an open space or area of the venue proximate to the UE. The resulting cancelation signal broadcast into the area where the UE is located may be used to cancel at least a portion of ambient sounds in the proximity of the speaker from reaching the ears of one or more users in that area.

Figure 6:
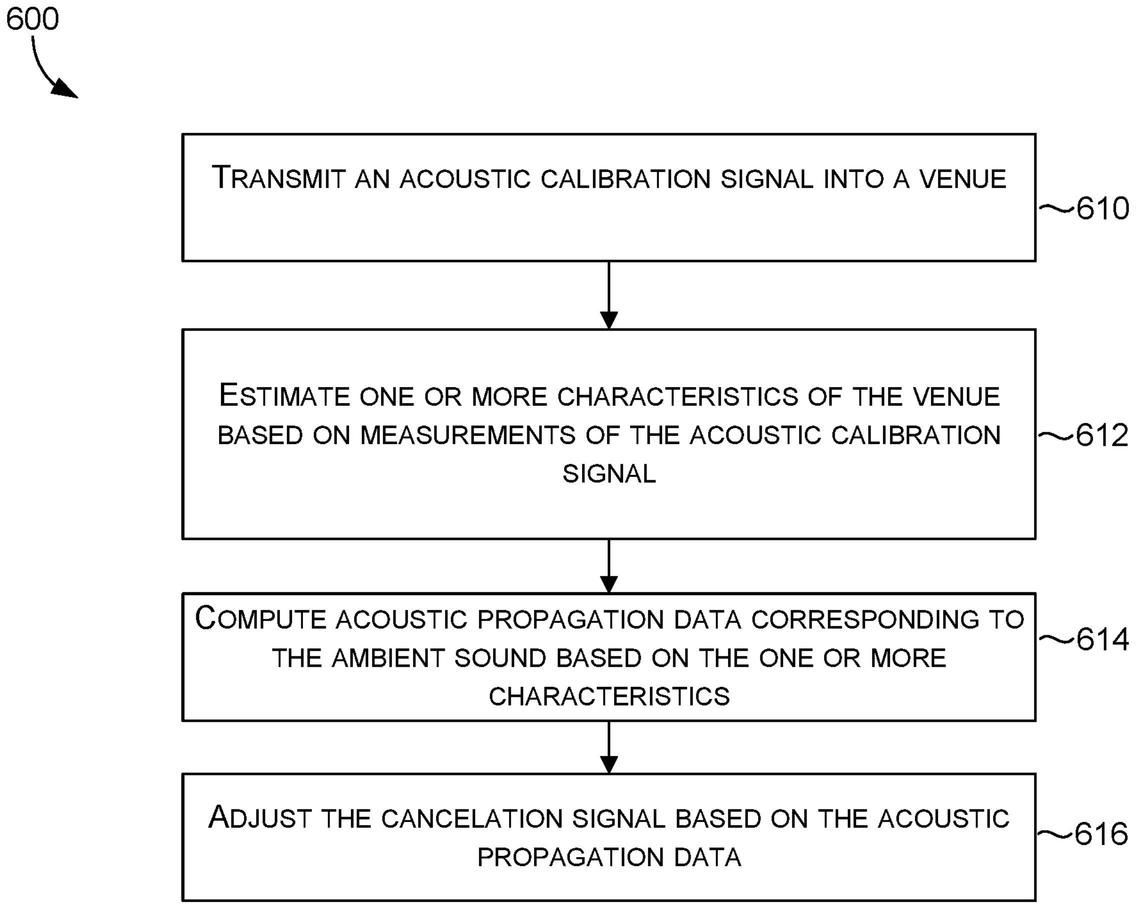
FIG. 6 is a flow chart illustrating an example method for an acoustic calibration protocol, in accordance with some embodiments described herein.

FIG. 6 is a flow chart illustrating a method 600 for an acoustic calibration protocol that may be used in conjunction with ambient sound mitigation network services, according to one embodiment. It should be understood that the features and elements described herein with respect to the method of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa. In some embodiments, elements of method 600 are implemented utilizing UE 110, ambient sound mitigation servicer 170 and/or other components of the network environment 100 as disclosed above. For example, one or more non-transient computer-readable media may store computer-usable instructions that, when executed by the one or more processors, cause the one or more processors to perform the method.

The method 600 at 610 includes transmitting an acoustic calibration signal into a venue. As shown in FIG. 2C, in some embodiments, a network environment may include one or more calibration microphones, and one or more calibration speakers, located within the venue 103. The one or more calibration microphones may include the acoustic sensor 114. The one or more calibration speakers may include the acoustic emitter 114. The method 600 at 612 includes estimating one or more characteristics of the venue based on measurements of the acoustic calibration signal. A calibration protocol under method 600 may include sending one or more calibration signals comprising one or more test tones (e.g., a spectrum of test tones) to the calibration speaker(s) for broadcast into the venue. The calibration signal(s) are received by the calibration microphone(s). In some embodiments, measurements of the calibration signals are returned to the venue acoustic profile generator.

The method 600 at 614 includes computing acoustic propagation data corresponding to the ambient sound based on the one or more characteristics. Based on one or more metrics derived using the returned measurements of the calibration signals (e.g., propagation delays and/or relative phase shifts and a function of frequency), the venue acoustic profile generator may compute the acoustic propagation data (for example, an estimate of the speed of sound in the venue, phase shifts and/or multipath signal summations incurred by the calibration signal(s) due to interactions with surfaces of structural elements). The propagation data may be stored in a venue acoustic profile associated with the venue. The method 600 at 616 includes adjusting the cancelation signal based on the acoustic propagation data. In some embodiments, the venue acoustic profile generator may re-execute the calibration protocol of method 600 periodically (e.g., once per minute) to refresh the propagation data to account for changes in the environmental conditions at the venue over time.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the embodiments described herein. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 710 that directly or indirectly couples the following devices: memory 712, one or more processors 714, one or more presentation components 716, input/output (I/O) ports 718, I/O components 720, power supply 722, and radio 724. Bus 710 represents what may be one or more busses (such as an address bus, data bus, or combination thereof). The devices of FIG. 7 are shown with lines for the sake of clarity. However, it should be understood that the functions performed by one or more components of the computing device 700 may be combined or distributed amongst the various components. For example, a presentation component such as a display device may be one of I/O components 720. In some embodiments, the UE 110 may comprise a computing device 700 where the HMI 305 may be implemented using the presentation component(s) 716. The processors of computing device 700, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device." In some embodiments, an ambient sound mitigation server as described in any of the examples of this disclosure (such as the ambient sound mitigation server 170, for example) may be implemented at least in part by code executed by the one or more processors (s) 714. The venue acoustic profile data 218 may be stored or otherwise implemented at least in part by memory 712.

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. Memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712 or I/O components 720. One or more presentation components 716 presents data indications to a person or other device. Exemplary one or more presentation components 716 include a display device, speaker, printing component, vibrating component, etc. I/O ports 718 allow computing device 700 to be logically coupled to other devices including I/O components 720, some of which may be built in computing device 700. Illustrative I/O components 720 include a microphone, joystick, game pad, satellite dish, scanner, printer, wireless device, etc.

Radio(s) 724 represents a radio that facilitates communication with a wireless telecommunications network. For example, radio(s) 724 may be used to establish communications with components of the core network edge 105. Illustrative wireless telecommunications technologies include CDMA, GPRS, TDMA, GSM, and the like. Radio 724 might additionally or alternatively facilitate other types of wireless communications including Wi-Fi, WiMAX, LTE, and/or other VoIP communications. As can be appreciated, in various embodiments, radio(s) 724 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Referring to FIG. 8, a diagram is depicted general at 800 of an exemplary cloud computing environment 810 for implementing one or more aspects of an ambient sound mitigation server as described in any of the examples of this disclosure (such as the ambient sound mitigation server 170, for example). Cloud computing environment 810 is but one example of a suitable cloud-computing environment and is not intended to suggest any limitation as to the scope of use or functionality of the embodiments presented herein. Neither should cloud-computing environment 810 be interpreted as having any dependency or requirement relating to any one or combination of components illustrated. In some embodiments, the cloud-computing environment 810 is executed within the core network edge 105, or otherwise coupled to the core network edge 105.

Cloud computing environment 810 includes one or more controllers 820 comprising one or more processors and memory. The controllers 820 may comprise servers of a data center. In some embodiments, the controllers 820 are programmed to execute code to implement at least one or more aspects of the ambient sound mitigation server, including the wave phase cancelation signal generator, network latency control function, and/or the venue acoustic profile generator.

For example, in one embodiment the wave phase cancelation signal generator, network latency control function, and/or the venue acoustic profile generator are virtualized network functions (VNFs) 830 running on a worker node cluster 825 established by the controllers 820. The cluster of worker nodes 825 may include one or more orchestrated Kubernetes (K8s) pods that realize one or more containerized applications 835 for the wave phase cancelation signal generator, network latency control function, and/or the venue acoustic profile generator. In some embodiments, the UE 110 may be coupled to the controllers 820 of the cloud-computing environment 810 by RAN 104 and core network edge 105. In some embodiments, venue acoustic profile data 218 may be implemented at least in part as one or more data store persistent volumes 840 in the cloud-computing environment 810.

In various alternative embodiments, system and/or device elements, method steps, or example implementations described throughout this disclosure (such as the UE, RAN Core Network Edge, Operator Core Network, Ambient Sound Mitigation Servicer, Acoustic Sensor(s) and/or Acoustic emitter(s), or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to: punch cards, magnetic disk or tape, any optical data storage system, flash read only memory (ROM), nonvolatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, the terms "function", "unit", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for providing ambient sound mitigation over a communications network, the system comprising:

one or more processors; and one or more computer-readable media storing computer-usable instructions that, when executed by the one or more processors, cause the one or more processors to:

establish at least one low latency network slice for at least one user equipment (UE) coupled to a radio access network, wherein the radio access network is configured to communicate with the at least one UE over one or both of uplink (UL) radio frequency (RF) signals and downlink (DL) RF signals;

generate a cancelation signal based on ambient sound mitigation data received by the radio access network, the ambient sound mitigation data including acoustic sensor data representing an ambient sound signal, wherein the cancelation signal is generated to comprise a phase shift with respect to the ambient sound signal computed at least in part as a function of a location of the at least one UE; and cause at least one acoustic emitter to emit an acoustic cancelation signal based on the cancelation signal.

2. The system of claim 1, the one or more processor further to:

generate the cancelation signal further based on a venue acoustic profile for a venue in which the at least one UE is located.

3. The system of claim 1, wherein the location of the at least one UE at least in part indicates a distance between the at least one UE and a source producing the ambient sound signal.

4. The system of claim 1, the one or more processor further to:

adjust the phase shift at least in part by controlling a latency characteristic of the at least one low latency network slice.

5. The system of claim 1, the one or more processor further to:

estimate a change in a speed of sound due to changes in environmental characteristics and adjust the phase shift at least in part based on the change in the speed of sound.

6. The system of claim 1, the one or more processor further to:

generate a venue acoustic profile for a venue in which the at least one UE is located based on broadcasting a calibration signal into the venue; and generate the cancelation signal further based on the venue acoustic profile.

7. The system of claim 6, wherein the venue acoustic profile comprises an acoustic map of the venue.

8. The system of claim 6, wherein the radio access network comprises a 5G New Radio (NR) base station and the at least one low latency network slice comprises an ultra-reliable low latency communications (URLLC) network slice.

9. The system of claim 6, wherein the radio access network comprises a base station coupled to an operator core network of a telecommunications network.

10. The system of claim 9, wherein the cancelation signal is generated by a server comprising a node of a network edge of the operator core network.

11. A telecommunications network, the network comprising:

at least one radio access network (RAN) coupled to a network operator core, wherein the at least one RAN communicates uplink (UL) and downlink (DL) signals between one or more user equipment (UE) within a coverage area of the at least one RAN and the network operator core; and a server communicatively coupled to the at least one RAN through a core network edge of the network operator core, the server comprising one or more processors that execute instructions to:

establish at least one low latency network slice coupling the one or more UE to the server via the radio access network;

generate a cancelation signal based on ambient sound mitigation data received by the at least one RAN, the ambient sound mitigation data including acoustic sensor data representing an ambient sound signal, wherein the cancelation signal is generated to comprise a phase shift with respect to the ambient sound signal computed at least in part as a function of a location of the one or more UE; and cause at least one acoustic emitter to emit an acoustic cancelation signal based on the cancelation signal.

12. The network of claim 11, the instructions further to:

adjust the phase shift at least in part by controlling a latency characteristic of the at least one low latency network slice.

13. The network of claim 11, the instructions further to:

transmit an acoustic calibration signal into a venue;

estimate one or more characteristics of the venue based on measurements of the acoustic calibration signal;

compute acoustic propagation data corresponding to the ambient sound signal based on the one or more characteristics; and adjust the cancelation signal based on the acoustic propagation data.

14. The network of claim 11, the instructions further to:

determine a distance between the one or more UE and at least one ambient sound source producing the ambient sound signal based on the location of the one or more UE.

15. The network of claim 11, the instructions further to:

generate a venue acoustic profile for a venue in which the one or more UE are located based on broadcasting a calibration signal into the venue; and generate the cancelation signal further based on the venue acoustic profile.

16. The network of claim 11, wherein the venue acoustic profile comprises an acoustic map of the venue.

17. The network of claim 11, wherein the at least one radio access network comprises a 5G New Radio (NR) base station and the at least one low latency network slice comprises an ultra-reliable low latency communications (URLLC) network slice.

18. A method for network based ambient sound mitigation, the method comprising:

receiving ambient sound mitigation data, including acoustic sensor data representing an ambient sound signal, from at least one user equipment (UE) coupled to a radio access network via at least one low latency network slice, wherein the radio access network is configured to communicate with the at least one UE over one or both of uplink (UL) radio frequency (RF) signals and downlink (DL) RF signals;

generating a cancelation signal based on the ambient sound mitigation data, wherein the cancelation signal is generated to comprise a phase shift with respect to the ambient sound signal computed at least in part as a function of a location of the at least one UE; and causing at least one acoustic emitter to emit an acoustic cancelation signal based on the cancelation signal.

19. The method of claim 18, further comprising:

adjusting the phase shift at least in part by controlling a latency characteristic of the at least one low latency network slice.

20. The method claim 18, further comprising:

generating the cancelation signal further based on a venue acoustic profile for a venue in which the at least one UE is located.

* * * * *